(12) United States Patent
Yu et al.

(10) Patent No.: US 10,907,795 B1
(45) Date of Patent: Feb. 2, 2021

(54) BATWING LENS LUMINAIRE

(71) Applicant: Vode Lighting LLC, Sonoma, CA (US)

(72) Inventors: Scott S Yu, Sonoma, CA (US); Richard Wong, Sonoma, CA (US)

(73) Assignee: VODE LIGHTING, INC, Sonoma, CA (US)

( * ) Notice: Subject to any disclaimer, the term of this patent is extended or adjusted under 35 U.S.C. 154(b) by 0 days.

(21) Appl. No.: 16/908,573

(22) Filed: Jun. 22, 2020

Related U.S. Application Data

(63) Continuation-in-part of application No. 29/729,902, filed on Mar. 31, 2020.

(51) Int. Cl.
*F21V 5/04* (2006.01)
*G02B 17/08* (2006.01)

(52) U.S. Cl.
CPC ............ *F21V 5/045* (2013.01); *G02B 17/086* (2013.01)

(58) Field of Classification Search
CPC .............................. F21V 5/045; G02B 17/086
See application file for complete search history.

(56) References Cited

U.S. PATENT DOCUMENTS

| | | | | |
|---|---|---|---|---|
| 1,977,689 | A * | 10/1934 | Muller | B61L 5/1845 340/815.76 |
| 8,469,552 | B2 * | 6/2013 | Moeller | F21V 7/0091 362/311.02 |
| 2003/0165065 | A1 * | 9/2003 | Roller | F21V 29/70 362/522 |

* cited by examiner

*Primary Examiner* — Evan P Dzierzynski
(74) *Attorney, Agent, or Firm* — Michael Petrin; Peter Tormey; Antero, Tormey & Petrin, PC

(57) ABSTRACT

A catadioptric lens assembly is disclosed for use with various light emitting sources. The lens assembly includes an upper section and a lower section, right and left portions thereof being symmetrically disposed about a center vertical optical axis defining a plane normal to and perpendicular to a longitudinal axis. The upper section includes two lens lobes with surfaces exhibiting a positively curved elliptical, circular or parabolic shape, being bilaterally symmetric about the vertical optical axis. The lower section includes a single lens lobe with a surface exhibiting a negatively curved spherical shape, bilaterally symmetric about the vertical optical axis, connecting to symmetric linear transition regions on both sides of the lower section and transitioning to edge support regions shared by the upper section of the lens assembly. Co-extrusion or selected surface treatment to form a top, bottom, or dual optical layer integral to surfaces of the catadioptric main lens enables improved dispersal of incident light resulting in more uniform illumination.

19 Claims, 10 Drawing Sheets

BATWING LENS LUMINAIRE

PRIORITY

This application claims the benefit of the priority of U.S. patent application Ser. No. 29/729,902, filed on Mar. 31, 2020, which is incorporated in its entirety by reference herein.

BACKGROUND

It is known to use light emitting sources, including for example, but not limited to, incandescent lamps, fluorescent tubes, and solid state light sources including, but not limited to light emitting diodes (LEDs), LED arrays, Lambertian emitters, $2\pi$ emitters, and fiber optic light guides, in a variety of applications, including, but not limited to, retail and commercial lighting applications where a uniform lighting field is desirable. Specifically, linear LED sources and LED arrays are increasingly finding applications in retail, commercial, and general lighting applications since their radiative light outputs have increased exponentially, prices have fallen significantly over the past few years and reliability of the materials have improved significantly, leading to lower installation and less frequent repair and replacement. LEDs are attractive due to their small size and the fact that they consume less power relative to incandescent and fluorescent light sources. The popularity of LEDs as light sources is expected to continue and increase as their potential benefits are further developed, particularly with respect to increased light output.

Available LEDs come in different sizes and different emitting cone angles. An emitting cone angle is typically referred to as $2\varphi$. LEDs emit light over a wide range of cone angles, ranging from 15 degrees (forward emitting or side emitting) to 180 degrees (hemispherical emitting). It is therefore very important to construct efficient light dispersal assemblies to harness the maximum possible light output from LEDs and direct it in a predetermined and controlled manner. Generally, these LED arrays are simply substituted into existing luminaires as an improved light source, but uniformity of the emitted light, even with a typical diffuser lens in place, is poorer due to the nature of the point source emissivity of the LEDS, even when combined and spaced at closer distances such as in a linear LED array designed to replace a fluorescent tube.

There is a need in the lighting systems field to create lighting systems and luminaires with improved and more uniform field illumination and which can be used with any type of light source or solid state light source such as an LED to direct light in a predetermined manner. According, there is also a need for improved lenses and light dispersion means that function better with point source emission devices, like LEDs and as well with linear LED arrays, that are able to better disperse incident light to create a brighter, more uniform and improved field of illumination. This invention provides such an improved LED dispersing lens system in the form of a catadioptric lens assembly.

SUMMARY

The present invention, as disclosed by the various inventive embodiments described hereinbelow, addresses these requirements by providing a catadioptric lens assembly including an upper section and a lower section featuring a plurality of lens lobes, the upper and lower sections encompassing a central section and terminating with end sections. The central section is bilaterally symmetric and centered about an optical axis, being symmetric to a plane passing through said optical axis and extending along the length of the catadioptric lens assembly. The end sections terminate the left and right sides of the catadioptric lens assembly and serve to provide a means to secure the lens assembly within a luminaire without visually obstructing the lens lob portions. The center section features two upper lobes with positively curved surfaces (convex) having a circular, elliptical or parabolic shape, both bilaterally symmetric about the optical axis. The center section features a single lower lobe with a negatively curved surface (concave) having a circular shape, being bilaterally symmetric about the same optical axis.

Based on ray-tracing results, but without being bound by theory, it is believed that the combination in the present inventive catadioptric lens assembly of a single lower optical lobe and two upper optical lobes that have opposite surface curvatures and whose center of radii are offset from the optical axis and positioned proportionally along the vertices of an inverted triangle, creates a much higher degree of internal reflection and subsequently a greater amount of refracted light being transmitted in a manner parallel to the optical axis, and such refracted light emanating from the inventive lens assembly is more uniformly dispersed. Further, the inclusion of either a top or bottom layer of an optical material with differing optical properties tends to increase internal refraction, resulting in even improved uniformity of emitting light. When such a top or bottom layer, or combination of the two are further selected or treated to have additional light scattering or light dispersion properties, such as for example, but not limited to texturing, hazing, etching, frosting or adding an opacifier or light scattering material, the presence of an additional layer or surface treatment to the catadioptric lens further improves the light collection and ultimately improves the overall dispersion and uniformity of light produced by a luminaire employing the inventive catadioptric lens assembly as disclosed herein in further, more detailed embodiments. Without being bound by theory, the inclusion of one or more layers having light dispersion or light scattering properties aids in the degree of internal reflection as well as internal refraction of light rays resulting in a more uniformly distributed light emission through the inventive lens systems without significant loss due to internal reflections that would otherwise divert incident light to the edges or upper receiving surfaces of the lens assembly.

These and other aspects and advantages of the present invention will become apparent upon reading the following detailed description of the invention in combination with the accompanying drawings.

Figure 1:
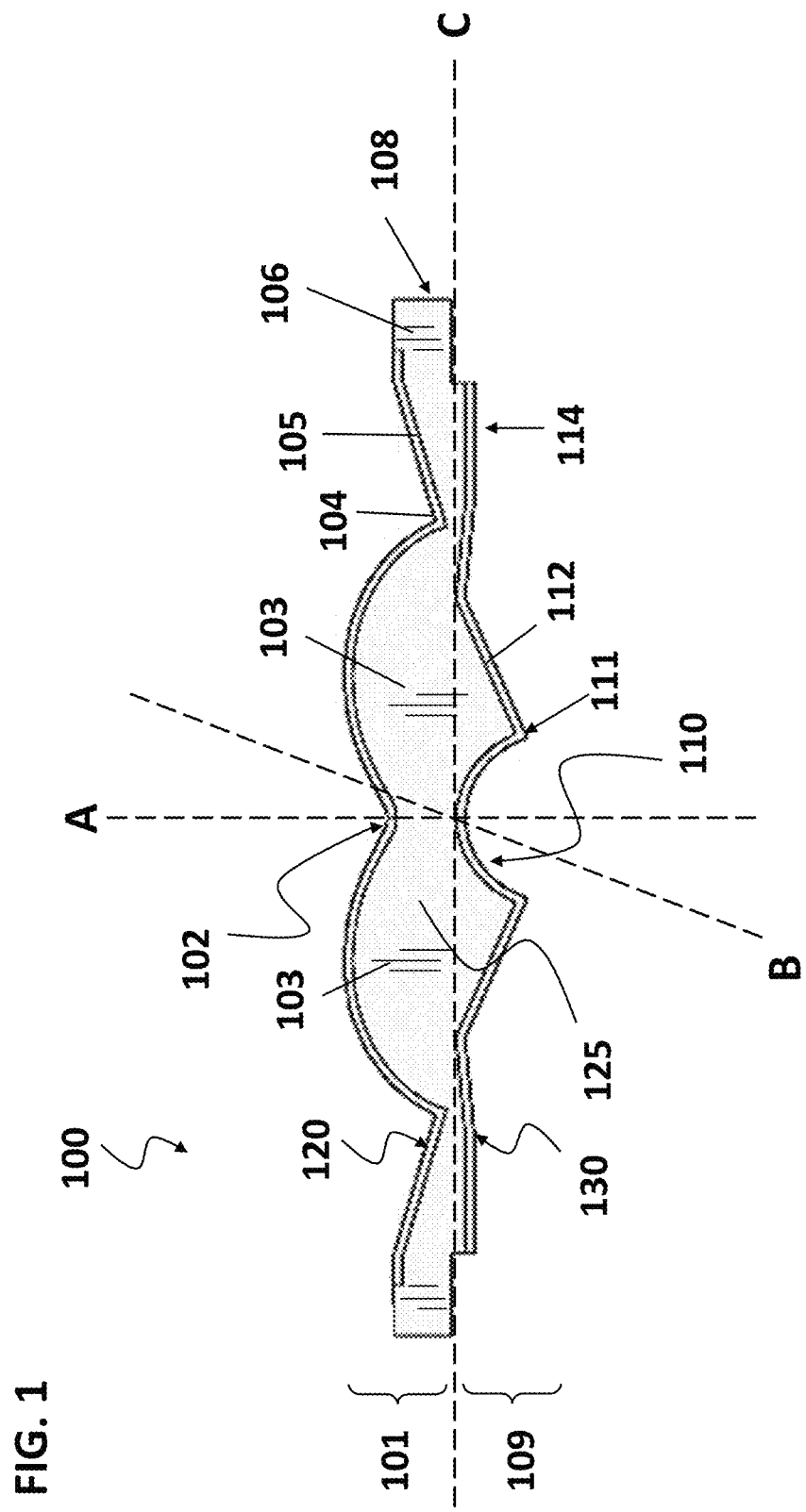
FIG. 1 shows an inventive embodiment of a cross-sectional representation of a coextruded catadioptric lens assembly or alternatively a lens assembly with upper and lower layers.

A corresponding Figure Key detailing the specific component parts, regions and configuration of embodiments of the inventive disclosure is attached to this Application in an Appendix, which is incorporated herein in its entirety.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Embodiments of the inventive disclosure presented herein include a catadioptric lens assembly for use with various light emitting sources. The lens assembly includes an upper section and a lower section that are both coplanar about a horizontal axis, and which are symmetrically centered about a vertical (normal) optical axis perpendicular to the longitudinal optical axis and a plane corresponding to these said two axes. The upper section includes two lobes whose surfaces feature a generally positively curved elliptical, circular or parabolic shape, being bilaterally symmetric about the vertical optical axis, and connecting to symmetric upper linear transition regions on both sides of the upper section further transitioning to corresponding edge support regions. The lower section of the inventive lens assembly features a single lobe whose surface features a generally negatively curved circular shape, the single lobe being bilaterally symmetric about the vertical optical axis, connecting to symmetric lower linear transition regions on both sides of the lower section transitioning to corresponding edge support regions, the upper and lower sections sharing said left and right edge support regions at the extreme left and right sides of the lens assembly. The top surface of the upper section of the lens assembly is the area of the lens assembly that is axially closest to the light emitting source. Co-extrusion of materials to form either a top, or bottom or dual coextruded layer integral to the surface of the catadioptric main lens enables uniform reflection and refraction of light incident to the top surface of the inventive lens assembly to be dispersed over a larger and more uniformly illuminated surface on the opposite or distal side (lower) of the inventive lens assembly. In various embodiments of the present invention as disclosed herein, the coextruded top and bottom layers may be of the same material, optical properties and optical density or alternatively the same material treated to have different optical properties, such as decreased translucency or transmission density to increase light scattering and dispersion properties, or may alternatively be of a different material, being compatible for co-extrusion and lamination onto the coextruded main lens region, but having different optical properties or densities. Examples include, but are not limited to, coextruded polymers having an added scattering material, or surface treatments to the coextruded polymer layers than provide translucency, such as frosting, etching, texturing, knurling and related surface modifications that provide for increased incident light dispersion.

Further inventive embodiments include a lens assembly with a single extruded main lens region which has optionally either a top, bottom or dual top and bottom layer of material intimately applied to the main lens region in a similar manner as illustrated for coextruded portions as disclosed herein, where the optional top and bottom layers are selected having differing optical properties than that of the main lens region.

One inventive embodiment of the present disclosure is a catadioptric lens assembly comprising (a) a lens configured to receive light from a light source; wherein said lens has an upper lens section and a lower lens section disposed opposite the upper lens section; wherein said upper and lower lens sections encompass a intermediate mains lens region; wherein the light from said light source is directed onto said upper lens section and is subsequently emitted from said lower lens section; wherein the upper lens section features a first and second bilaterally symmetric upper lens lobe each with surfaces exhibiting positive curvatures situated about a center optical axis A that is normal and perpendicular with respect to a cross-sectional plane through the upper lens section; wherein said lower lens section features a single symmetric lower lens lobe with a surface exhibiting negative curvature situated about said center optical axis A; wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively; wherein said lower lens lobe is contiguous and adjacent to right and left lower linear transition regions; wherein said right and left lower transitions regions are contiguous and adjacent to said right and left edge support regions, respectively; and (b) a light source; wherein said light source is selected from a point source, a linear source, and a linear array of point sources.

Another inventive embodiment of the present disclosure is a catadioptric lens assembly wherein at least a portion of either said upper or lower surfaces of said upper and lower lens sections is composed of materials having different optical properties from said main lens region.

Yet another inventive embodiment of the present disclosure is a catadioptric lens assembly wherein said upper lens section comprises an upper coextruded top layer adjacent to and contiguous with said upper lens section and extending from a first left edge support region to a second right edge support region.

A further inventive embodiment of the present disclosure is a catadioptric lens assembly wherein said lower lens section comprises a lower coextruded bottom layer adjacent to and contiguous with said lower lens section and extending from a first left edge support region to a second right edge support region.

Yet a further inventive embodiment of the present disclosure is a catadioptric lens assembly wherein said upper lens section comprises an upper coextruded top layer adjacent to and contiguous with said upper lens section and extending from a first left edge support region to a second right edge support region; and wherein said lower lens section comprises a lower coextruded bottom layer adjacent to and contiguous with said lower lens section and extending from a first left edge support region to a second right edge support region.

Another inventive embodiment of the present disclosure is a catadioptric lens assembly wherein said portion of either of said upper or lower surfaces of said upper and lower lens sections comprises a contiguous film of uniform thickness of a material having different optical properties from said main lens region.

A further inventive embodiment of the present disclosure is a catadioptric lens assembly wherein said upper lens lobes have upper surfaces exhibiting a surface curvature corresponding to a segment selected from a circle, ellipse and parabola; and wherein said lower lens lobe has a lower surface exhibiting a surface curvature corresponding to a segment of a circle.

Yet a further inventive embodiment of the present disclosure is a catadioptric lens assembly wherein said upper lens lobes with upper surfaces exhibiting a convex surface curvature corresponding to a segment of a circle have centers of origin C2 and C3 located on a horizontal plane parallel to a plane bisecting said upper and lower lens sections, and have a radius of R2.

Another inventive embodiment of the present disclosure is a catadioptric lens assembly wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3.

Yet another inventive embodiment of the present disclosure is a catadioptric lens assembly wherein said upper lens lobes with upper surfaces exhibiting a convex surface curvature corresponding to a segment of a parabola have centers of origin C2 and C3 located on a horizontal plane parallel to a plane bisecting said upper and lower lens sections, and have a radius of R2 and a parabolic constant of n.

An additional inventive embodiment of the present disclosure is a catadioptric lens assembly wherein said lower lens lobe with a lower surface exhibiting a concave surface curvature corresponding to a segment of a circle has a center of origin C1 located on a normal perpendicular axis A, and having a radius of R1.

Another inventive embodiment of the present disclosure is a catadioptric lens assembly wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3; and wherein said lower lens lobe with a lower surface exhibiting a concave surface curvature corresponding to a segment of a circle has a center of origin C1 located on a perpendicular optical axis A, and having a radius of R1.

Yet another inventive embodiment of the present disclosure is a catadioptric lens assembly wherein said second and third centers of origin C2 and C3 are located on a horizontal plane bisecting said upper lens section and said lower lens section; with a first center of origin located on said perpendicular optical axis A; wherein said first, second and third centers of origin C1, C2 and C3 are positioned in a triangular relationship; wherein C1, C2 and C3 are located on the vertices of a hypothetical equilateral triangle wherein C1 is located on said perpendicular optical axis A; wherein C1 is located below said horizontal plane; and wherein C2 and C3 are located on a horizontal plane parallel to a plane bisecting said upper and lower lens sections.

One additional inventive embodiment of the present disclosure is a catadioptric lens assembly wherein said portion of either said upper and lower surfaces of said upper and lower lens sections is composed of materials that exhibit light scattering properties; and wherein said main lens is composed of an optically clear material.

Another inventive embodiment of the present disclosure is a luminaire, comprising: (a) at least one light source; (b) a catadioptric lens assembly configured to receive light from at least one solid state light source; wherein said lens assembly has an upper lens section, an intermediate main lens region and a lower lens section disposed opposite the upper lens section; wherein the light from said light source is directed onto said upper lens section and is subsequently emitted from said lower lens section; wherein the upper lens section comprises a first and second bilaterally symmetric upper lens lobe each with surfaces exhibiting positive curvatures situated about a center optical axis A that is normal and perpendicular with respect to a cross-sectional plane through the upper lens section; wherein said lower lens section features a single symmetric lower lens lobe with a surface exhibiting negative curvature situated about said center optical axis A; wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively; wherein said lower lens lobe is contiguous and adjacent to right and left lower linear transition regions; wherein said right and left lower transitions regions are contiguous and adjacent to said right and left edge support regions, respectively; and (c) a housing supporting said light source and said catadioptric lens assembly.

Another inventive embodiment of the present disclosure is a luminaire wherein said light source is a solid state light source selected from an LED, LED array, Lambertian emitter, $2\pi$ emitter, and fiber optic light guide.

Yet another inventive embodiment of the present disclosure is a luminaire wherein said light source is a linear light source selected from an incandescent lamp, fluorescent tube, linear LED, linear LED array, linear Lambertian emitter, and linear fiber optic light guide.

A further inventive embodiment of the present disclosure is a luminaire wherein at least a portion of either said upper or lower surfaces of said upper and lower lens sections is composed of materials having different optical properties from a main lens region located between said upper and lower lens surfaces; wherein said upper lens section comprises an upper coextruded top layer adjacent to and contiguous with said upper lens section and extending from a first left edge support region to a second right edge support region; and wherein said lower lens section comprises a lower coextruded bottom layer adjacent to and contiguous with said lower lens section and extending from a first left edge support region to a second right edge support region.

Yet another inventive embodiment of the present disclosure is a luminaire wherein at least a portion of either said upper or lower surfaces of said upper and lower lens sections is composed of materials having different optical properties from a main lens region located between said upper and lower lens surfaces; and wherein said portion of either of said upper or lower surfaces of said upper and lower lens sections comprises a contiguous film of uniform thickness of a material having different optical properties from said main lens region.

DETAILED DESCRIPTION

FIG. 1 shows a cross-sectional representation of one inventive embodiment of a catadioptric lens assembly 100. The lens assembly 100 continues longitudinally along an optical longitudinal axis B that is perpendicular to an optical vertical axis A and extends along the length of the lens assembly (not shown) for any desired length, L. The lens assembly 100 includes an upper section 101 and a lower section 109, section 101 being above the horizontal lens axis C, section 109 starting immediately below the horizontal lens axis C, as shown in FIG. 1. The upper section 101 and lower section 109 are both coplanar about the horizontal axis C, but not symmetric to this axis or a plane along this axis. The upper section and lower section are also both bilaterally centered about the vertical optical axis A that is perpendicular to the longitudinal optical axis B. The upper section includes two lobes 103 whose surfaces have a generally positively curved (convex) circular, elliptical or parabolic shape, the two lobes being bilaterally symmetric to the vertical optical axis A at a lens center transition plane 102 (see also FIG. 4 A/B plane), the distal ends of each of the two upper lens lobes 103 connecting via a upper lobe transition plane 104 to symmetric upper linear transition regions 105 on both sides of the upper section further transitioning to corresponding edge support regions 106 that terminate with outer lens edges 108. The lower section 109 features a single lower lens lobe 110 that has a generally negatively curved (concave) spherical shape, the single lobe being bilaterally symmetric about the vertical optical axis A, connecting via lower lobe transition planes 111 to symmetric linear transition regions 112 on both sides of the lower section transitioning to corresponding edge support regions 114, the upper and lower section sharing left and right edge support regions 106.

Note that in FIG. 1 and corresponding figures and descriptions of the inventive embodiments herein, only one side of a symmetric element or feature may be labeled in the figure to avoid congestion, but its left- or right-handed counterpart symmetric about the indicated axis or plane is referred to herein as X', relating to X by symmetry of projection with respect to the indicated axis or plane.

Accordingly, the inventive lens assembly 100 is bilaterally symmetric with respect to the normal or perpendicular optical vertical axis A, both left and right sides of the lens assembly being identical mirror images with respect to each other. The lens assembly 100 is linearly contiguous and uniform about its cross-section along the longitudinal axis (B) that is coincident to, and extends along the length, L.

The top surface of the upper section of the lens assembly is the area of the lens assembly that is axially closest to the light emitting source, whose axis is centered around the optical vertical axis A.

In a luminaire configuration featuring a linear array of light emitting sources, the orientation of the linear array is coincident to the optical longitudinal axis B, or in other words, is positioned parallel with the longitudinal axis B that is coincident to the length dimension of the lens assembly.

In the embodiment shown in FIG. 1, the lens assembly features a coextruded upper layer 120 attached to a proximal or top side of the extruded lens region 125, with a second coextruded lower layer 130 attached to a distal or bottom side of the intermediate extruded lens region 125. In one embodiment, the coextruded top layer 120 is contiguous with and extends along the entire top lens section 101 from the left upper linear transition region (105) to the right upper linear transition region 105 (as labeled). In another related embodiment, the coextruded top layer 120 is contiguous with and extends along the entire top lens section 101 from the left edge support region (106) to the right edge support region 106, or extends to intermediate positions between each of said right and left regions 105 and 106, respectively. Generally, neither the coextruded top layer 120 nor the coextruded bottom layer 130 extend to the extreme edge of the lens assembly 100 denoted as the left outer edge (108) and right outer edge 108 (as labeled), as the edge support regions are used to support the lens assembly and not generally exposed to, or within the optical path of light.

Figure 2:
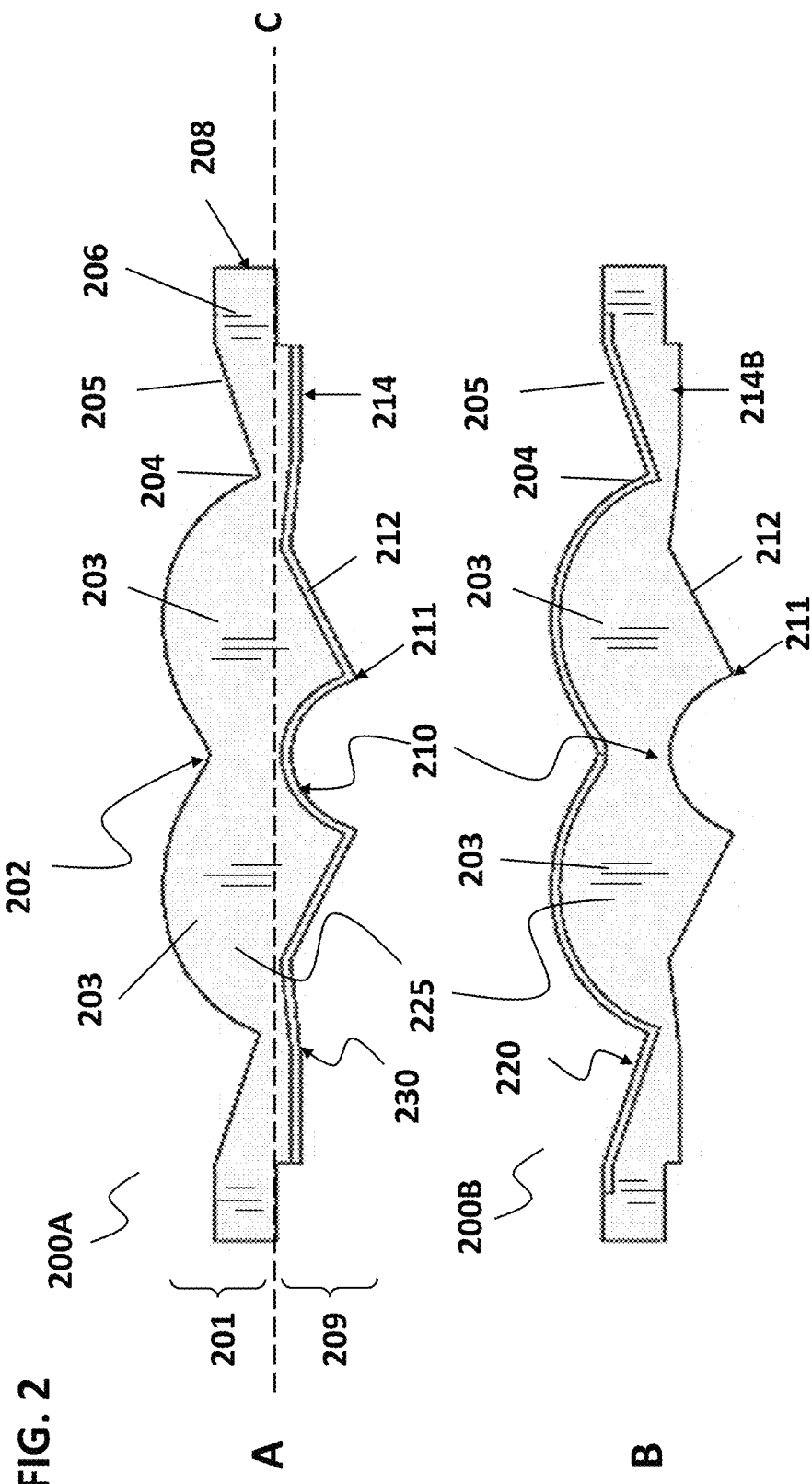
FIG. 2 shows inventive embodiments of a cross-sectional representation of a coextruded catadioptric lens assembly with either a top or bottom coextruded portion or alternatively with either a lower or upper layer.

In further related embodiments of the present disclosure, as shown in FIG. 2, the optional coextruded layers can be applied singly to one or either side of the extruded mains lens region 225, as shown in two embodiments labeled A and B. 200A shows one embodiment of the present disclosure featuring a lens assembly with lower coextruded bottom layer 230 only, with no upper coextruded layer or surface treatment to the upper section or surface of the upper lens section 201 and not modifying the surface of either of the upper lens lobes (left and right) 203 having a Lens center transition plane 202 at the junction of said upper lens lobes 202 and left and right upper lobe transition planes 104 also lacking a coextruded top layer or surface treatment in the embodiment 200A shown in example A.

A second embodiment 200B shown in example B in FIG. 2 features a coextruded lens having only a coextruded top layer 220 that is contiguous with the top surface of upper lens section 201 of extruded main lens region 225 and extends along the entire top lens section 201 from the left edge support region (206) to the right edge support region 206, or extends to intermediate positions between each of said right and left regions 205 and 206, respectively. Generally, neither the coextruded top layer 220 nor the coextruded bottom layer 230 extend to the extreme edge of the lens assemblies 200(A,B) denoted as the left outer edge (208) and right outer edge 208 (as labeled).

In related embodiments, an optional Coextruded top layer 220 and Coextruded bottom layer 230 may be formed onto the extruded main lens region 225 as either a contiguous coextruded layer or as a contiguous surface treatment the surface of the extruded mains lens region 225, said surface treatment extending across the same surface area as represented by the respective top and bottom coextruded layer regions of the lens assemblies 200 (A, B).

Figure 3:
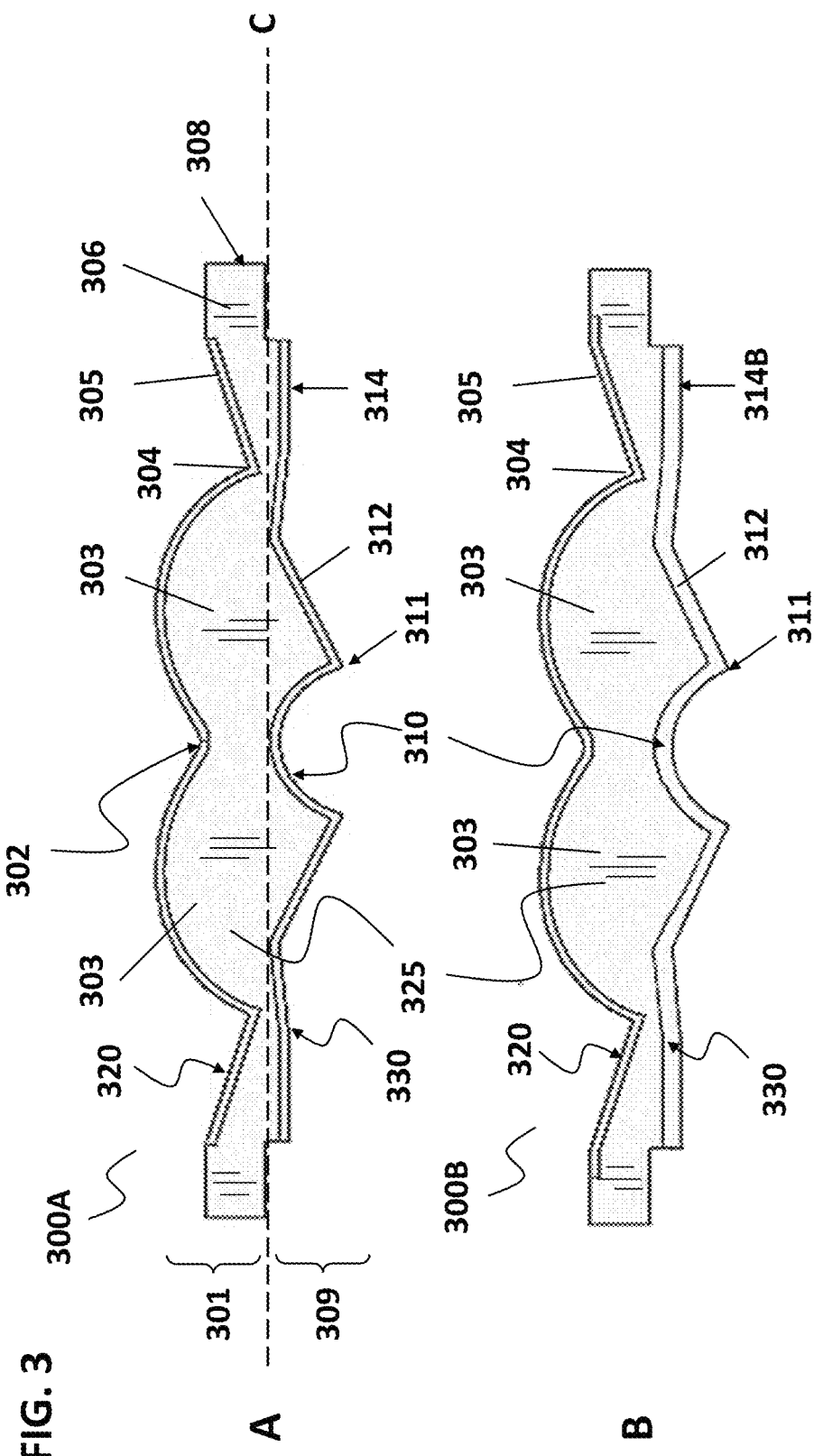
FIG. 3 shows an inventive embodiment of a cross-sectional representation of a coextruded catadioptric lens assembly or alternatively a lens assembly with upper and lower layers wherein the coextruded portions or layers have differing thicknesses.

In further related embodiments of the present disclosure, as shown in FIG. 3, the optional coextruded layers can be applied singly to one or either side of the extruded mains lens region 325, as shown in two embodiments labeled A and B. 300A shows one embodiment of the present disclosure featuring a lens assembly with both a lower coextruded bottom layer 330 only and upper coextruded layer 320 or surface treatment to the upper section or surface of the upper lens section 301.

A second embodiment 300B shown in example B in FIG. 3 features a coextruded lens having a coextruded top layer 320 that is contiguous with the top surface of upper lens section 301 of extruded main lens region 325 and extends along the entire top lens section 301 from the left edge support region (306) to the right edge support region 306, or extends to intermediate positions between each of said right and left regions 305 and 306, respectively. Generally, neither the coextruded top layer 320 nor the coextruded bottom layer 330 extend to the extreme edge of the lens assemblies 300(A,B) denoted as the left outer edge (308) and right outer edge 308 (as labeled).

In the example embodiment 300A, the coextruded top layer 320 extends to the junction of the upper transition region 305 and the edge support region 306. In the example embodiment 300B, the coextruded top layer 320 extends slightly beyond the junction of the upper transition region 305 and the edge support region 306, to a point intermediate between the outer edge 308 and the upper linear transition region 305, for both the left and right symmetric sides of the lens assemblies 300.

In related embodiments, an optional coextruded bottom layer 330 may be formed onto the extruded main lens region 325 as either a contiguous coextruded layer contacting the lower surface of the extruded mains lens region 325, said bottom layer 330 being coextruded with a greater cross-sectional thickness compared to the top layer 320. In related embodiments, the thickness of an upper or lower coextruded layer can vary according to need, from 0.001" to 0.25" in thickness for example. In related embodiments wherein the upper and lower layers are not coextruded but are applied as films or layers to a center extruded mains lens section, the thickness can also vary according to need, from about 0.001" to about 0.10" in thickness, depending on the laminate or film thickness employed. In related embodiments wherein the upper and lower layers are not coextruded but are post-treated to change their optical properties, such treatments including etching, frosting, knurling, templating and other such surface patterning techniques generally modify the surface to some depth depending on the mechanical nature of the technique, and the layer thickness would correspondingly be defined by the maximum effective depth of such treatment in creating a layer of material with differing optical properties than that of the center extruded mains lens section.

Figure 4:
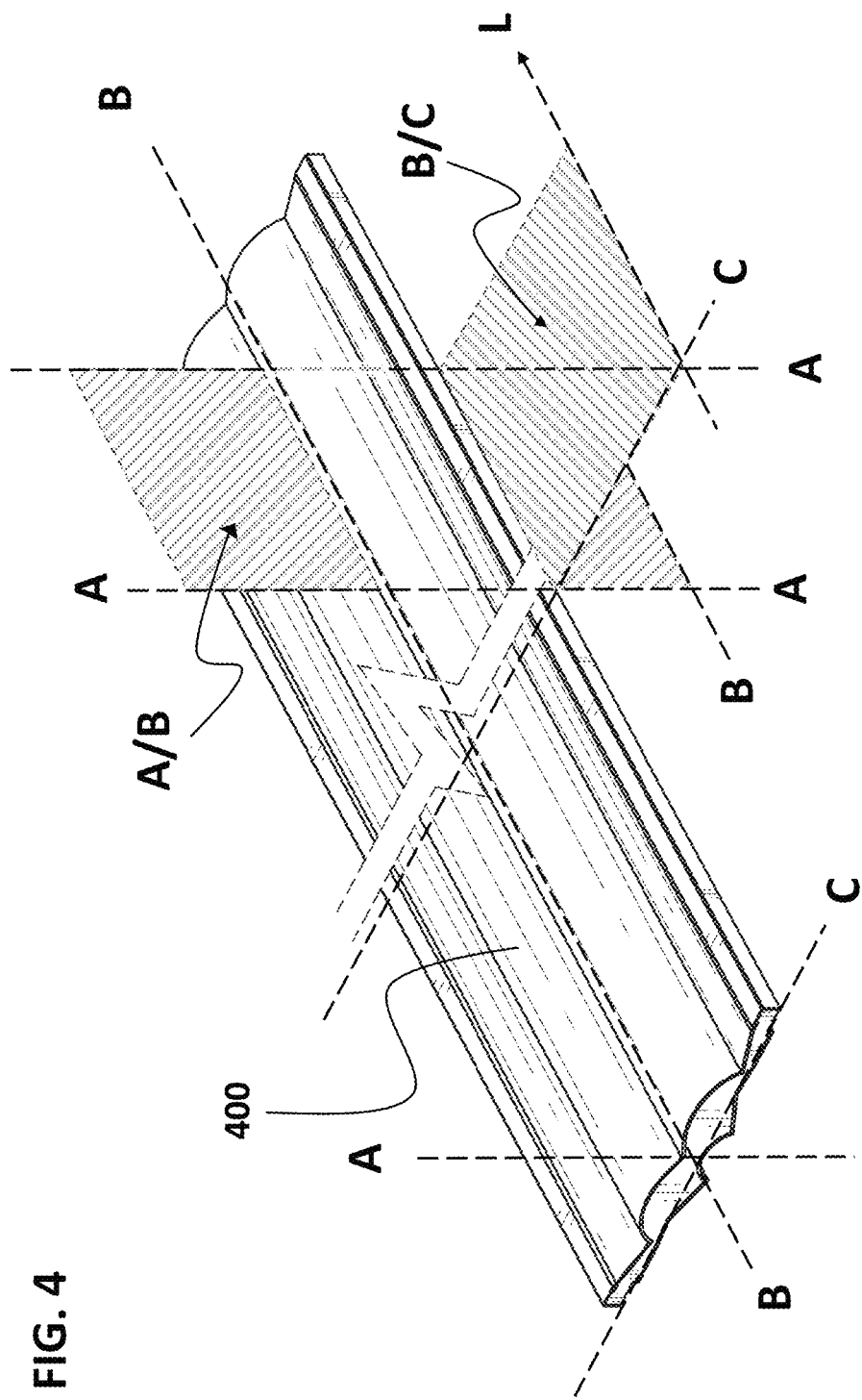
FIG. 4 shows a graphical representation of the various axis of an inventive embodiment of a catadioptric lens assembly including a normal axis A that is perpendicular to the horizontal axis C and perpendicular to the longitudinal axis C, and the associated two dimensional planes of projection about the indicated axis.

FIG. 4 shows an inventive embodiment of a lens assembly 400 with the principal axis and planes indicated by the direction of the dotted lines and hatched planes denoting the longitudinal and perpendicular planes of the lens assembly 400. Here, A is the normal (vertical) axis extending perpendicularly at a normal right angle of 90° ninety degrees from a horizontal longitudinal plane B/C that passes through the length L of the lens assembly 400, perpendicular to both the B and C axis. It can clearly be noted that the left and right side of the lens assembly 400 about the center axis is bilaterally symmetric with respect to the projected perpendicular or vertical A/B plane. Here, B is the linear or longitudinal axis and C is the horizontal or planar axis, the vertical A/B plane being normal (perpendicular) to the C axis and perpendicular to the longitudinal B/C plane. As can be surmised from this and the preceding figures is that the lens assembly 400 may be extruded or coextruded into its indicated shape and form having any arbitrary length L, being symmetric about the vertical A/B plane and continuously non-varying with respect to the extruded cross-sectional area and shape so as to be infinitely linear symmetric, or linearly translationally symmetrical along the B axis for the length L.

In operation, a linear light source or linear array of discreet light elements are positioned so the light emission emanating from the linear light source or collective array is directed downwards along the direction of the A axis onto the top surface of the lens assembly 400, the linear light source or linear array being positioned along the A/B plane at an appropriate distance of separation from the top surface of 400. A minimum distance of separation of a light source from the inventive catadioptric lens is a distance from said light source to the top saddle position or intersection of the upper lens surface with the lens center transition plane 102 sufficient for the cone of emission of the respective light source to strike the apexes of each of the right and left upper lens lobes, while a maximum distance of separation is one wherein all light rays within said cone of emission of said light source strikes the entire upper surface of the lens assembly up to but not including either the left or right side edge support regions.

Figure 5:
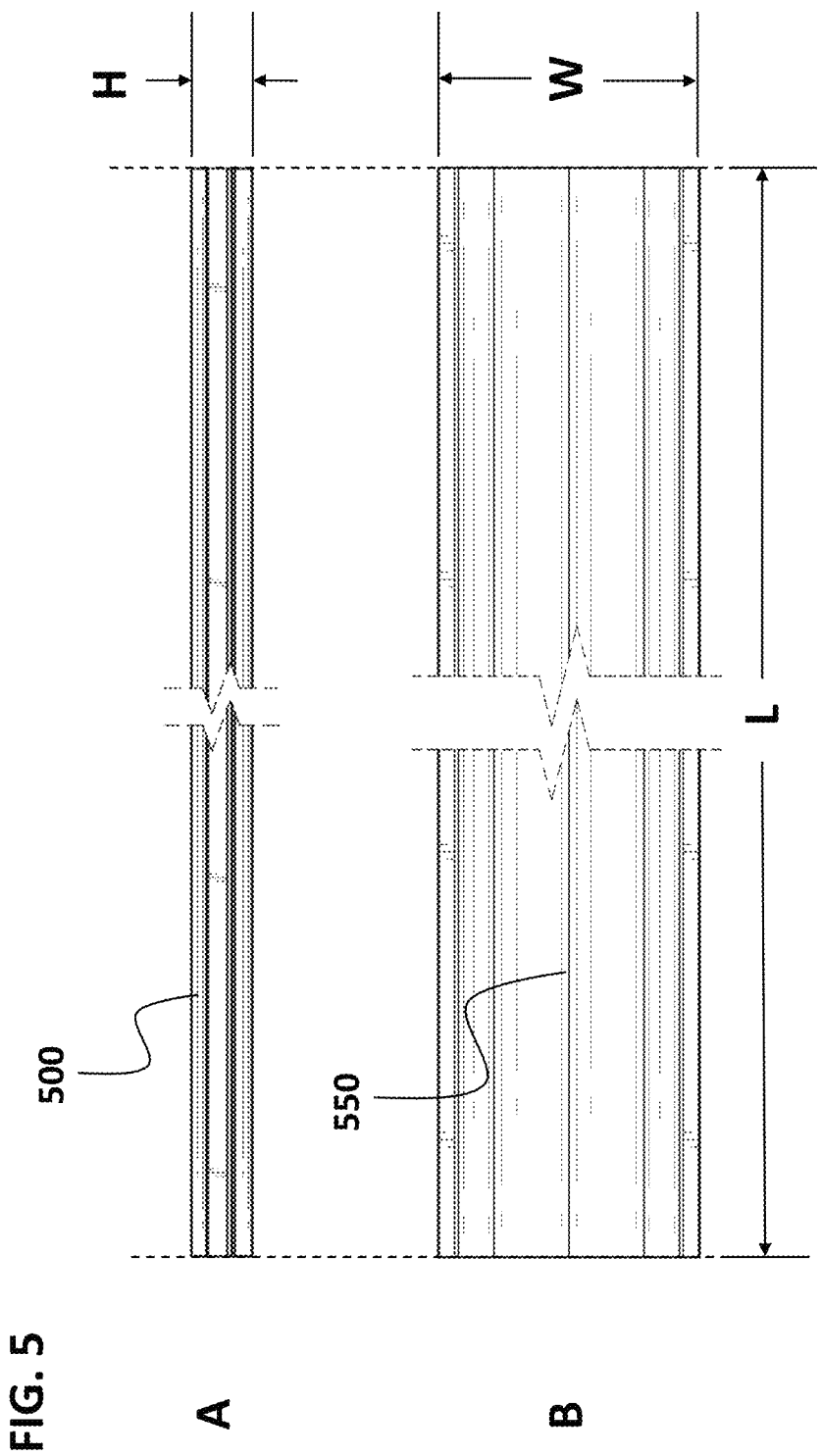
FIG. 5 shows side and top views of one embodiment of a catadioptric lens assembly with indicated dimensions.

FIG. 5 shows one embodiment of the present disclosure, a lens assembly 500 viewed from either the right or left side as shown in viewpoint A, having a maximum cross-sectional height H. Viewpoint B shows a top view 550 of the lens assembly 500, wherein W is the maximum side-to-side width, and L is the overall length of 500. L can be any desired length, generally being at least equal to or greater than the width, W to fashion a square (L=W) or rectangular (L>W) lens assembly. While all three dimensions H, W and L may vary, the relative magnitudes or ratios of parameters W and H are generally maintained at a fixed value or within a fixed range in order to preserve the unique reflective/refractive light distribution characteristics of the inventive lens assemblies disclosed and embodied herein, as disclosed later herein below in further example embodiments and in Table I.

Figure 6:
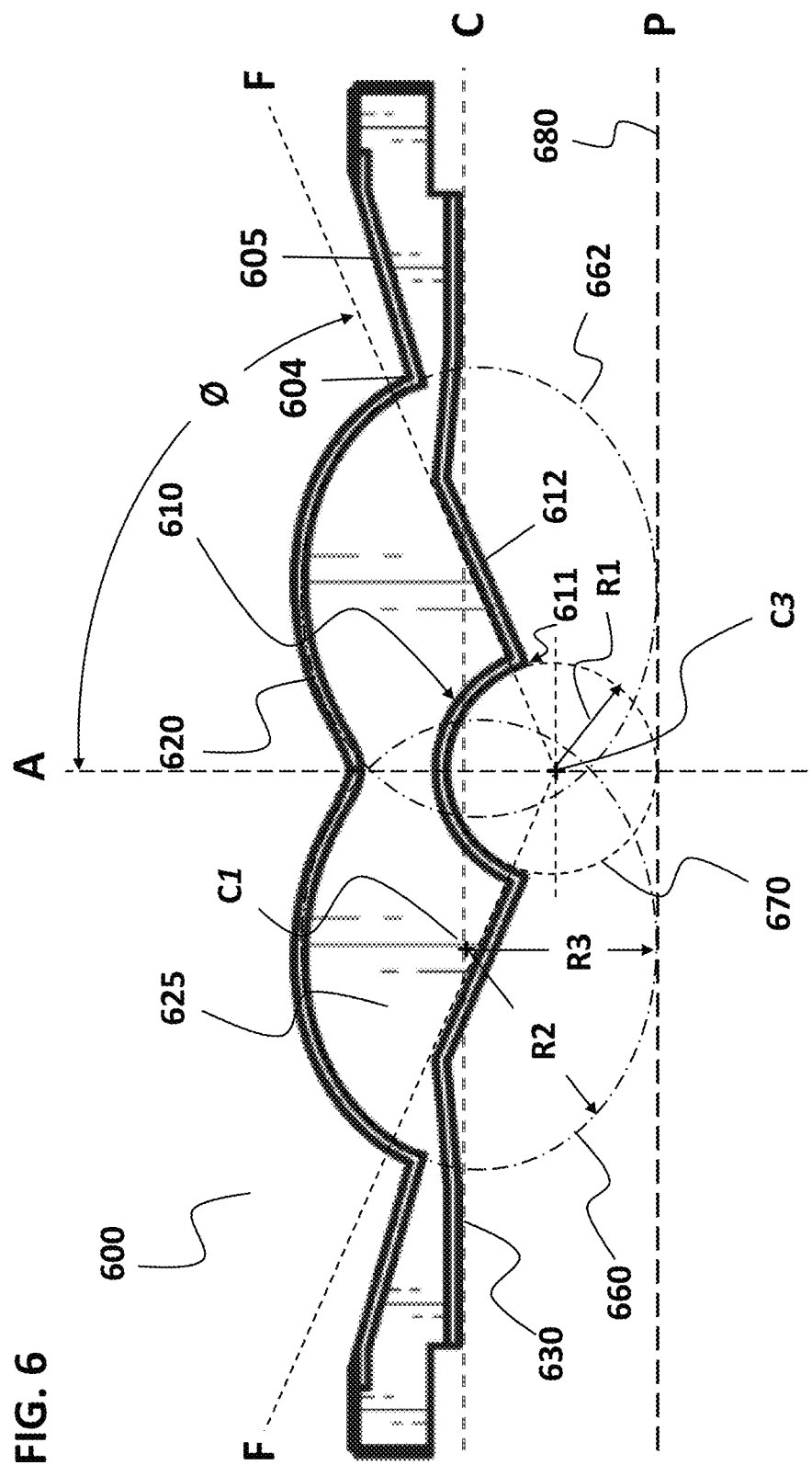
FIG. 6 shows an inventive embodiment of a cross-sectional representation of a coextruded catadioptric lens assembly having dual elliptical shaped upper lens lobes in combination with a singular circular shaped lower lens lobe with indicated centers of origin and radii.

FIG. 6 shows one embodiment of an inventive lens assembly 600 having both a coextruded top layer 620 and coextruded bottom layer 630 sandwiching an extruded main lens region 625. As seen in FIG. 6, the lens assembly 600 is bilaterally symmetric about a center plane that extends along and perpendicular to the normal or perpendicular axis A, in a linear direction L (not shown here, see FIG. 5) that further extends in a direction perpendicular to both axis A and plane C and the parallel projection plane 680 denoted as P. The inventive lens assembly 600 features two identical, bilaterally symmetric left and right upper (top) lens lobes 603 (and 603' not labelled) whose surface curvatures are circumscribed by the dotted circumferential line 660 (left) and 662 (right), which define an ellipse having a major radii R2 and a minor radii R3, as shown, the origins of each of the radii R2 and R3 are points (C1 shown, C2 not shown) that coincide with and are positioned along the planar C axis. The left and right upper lens lobes 603 are positively curved surfaces, e.g. convex with respect to the incident light injected into the lens assembly 600 from the top surface along the direction of the A axis, so that illumination is incident to the top surface of the lens assembly 600. The lower lens lobe 610 is oriented having a negatively curved surface, e.g., concave with respect to the lower surface of the lens assembly 600, shown circumscribed by a dotted circular line 670 (inscribed circle), which defines a circle having a lower lobe radius R1, wherein the center point (origin) of said circumscribed circle coincides with the normal A axis, as shown in FIG. 6, and the lower lens lobe 610 therefore also being bilaterally symmetric about the plane A/B extending along the length, L, of the lens assembly as shown in FIG. 4.

In one embodiment, the inventive lens assembly 600 is an coextruded catadioptric lens assembly featuring two positively curved convex bilaterally symmetric upper lobes located on an upper surface of said lens assembly, each of said upper lobes having an elliptical surface curvature defined by a major and minor radius of R2 and R3, respectively, in combination with a single, axially symmetric negatively curved concave lower lobe located on a lower, or opposed surface of said lens assembly, having a circular surface curvature defined by a radius R1, wherein the centers of origin (C1) of R2 and R3, and R2' and R3' (the latter not shown in FIG. 6, but having a center of origin C2) are located along the planar C axis, and wherein the center of origin of R1 (C3) is located along the perpendicular axis A, and wherein the corresponding centers of origin, C1, C2 and C3 are disposed in a triangular relationship, defining a triangle with corner vertices of said triangle being at the positions corresponding to C1, C2 and C3.

In related inventive embodiments, the inventive lens assembly 600 as shown in FIG. 6 can be produced with only a single upper coextruded top layer 620, or alternatively with only a single lower coextruded bottom layer 630, while maintaining the inventive surface curvatures that enable the catadioptric lens assembly 600 to disperse incident light in a desired uniform disperse illumination pattern.

In an alternative embodiment, the lower lens surface 614 of the inventive lens assembly 600, exhibits a lower linear transition region 612 which follows a straight line segment (E) originating at the locus of R1 on the perpendicular axis A as shown in FIG. 6, and extending either parallel to or coincident to the surface of said lower linear transition region 612, whether or not also including a lower coextruded region 630, wherein the straight line segment E originates at R1 and makes an angle designated theta (Ø) with respect to said axis A, both the left and right lower linear transitions regions 612 and 612' being symmetric about a plane drawn through the A axis and extending along the length of the lens assembly 600 (see the AB plane in FIG. 4). FIG. 6 also shows the angle theta (Ø) between the perpendicular axis A and the plane of the surface coinciding with the lower linear transition region 612, originating from C3 and starting from the point the inscribed radii R1 makes with the lower lobe 610, being the point of origin of the lower lobe transition plane 611.

In related embodiments, the inventive lens assembly can be configured in a various shapes and sizes, proportionally and symmetrically sized about a center plane AB that extends along the length, L, of an extruded or coextruded lens assembly. In these embodiments, the various radii of curvature, R1, R2 and R3 and the angle theta (Ø) defining the angle of inclination of a lower linear transition region can take on a variety of values as shown in Table I.

In further related embodiments, the two positively curved convex bilaterally symmetric upper lobes may have surfaces defined as circular, described by having a single radius of curvature, R2, with symmetric centers of origin, C2 and C3, respectively as disclosed herein. In yet other related embodiments, the two positively curved convex bilaterally symmetric upper lobes may have surfaces defined as parabolas, described by having surface shape following a parabolic relationship equivalent to $n*(R2)^2$ relationship (wherein n=non-integer numeric parabolic constant), and also having symmetric centers of origin, C2 and C3, respectively as disclosed herein.

Figure 7:
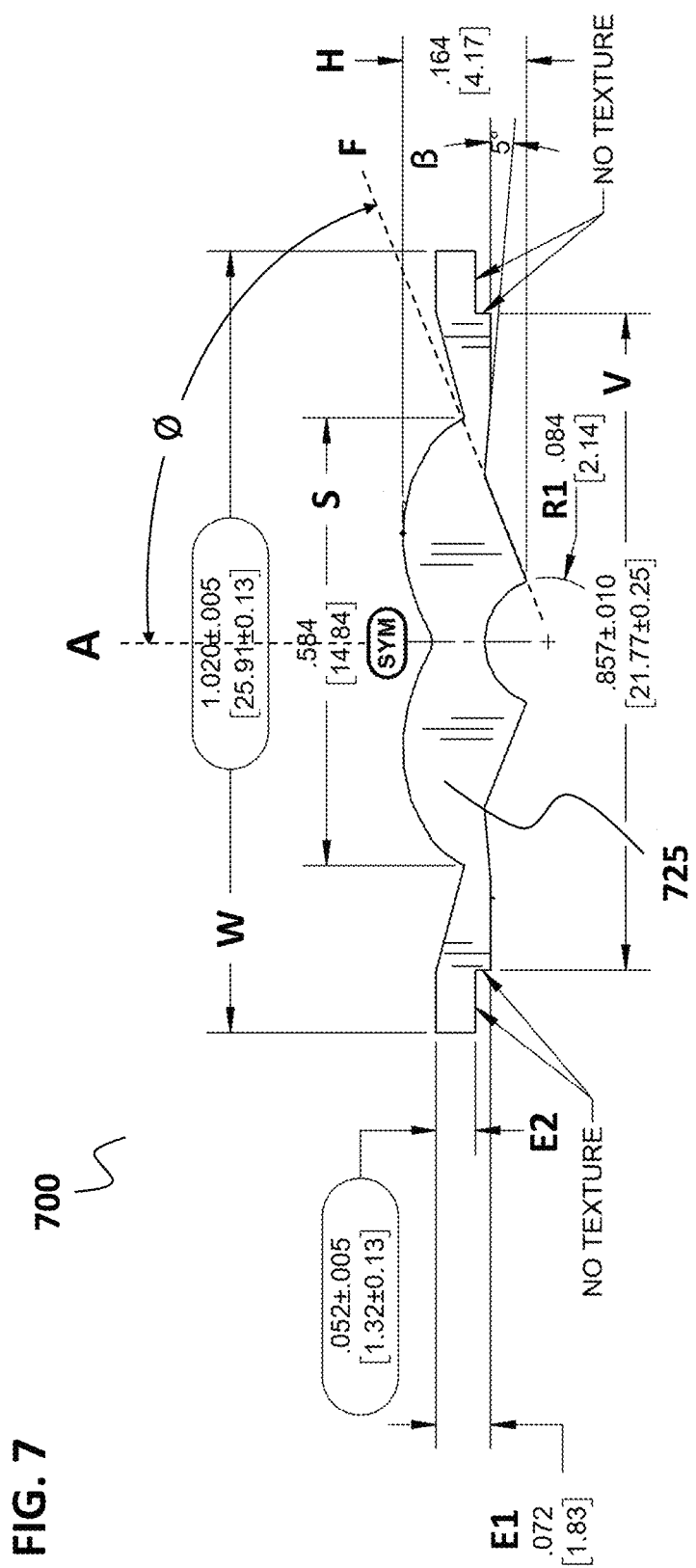
FIG. 7 shows an inventive embodiment of a cross-sectional representation of an extruded catadioptric lens assembly with example parametric dimensions, tolerances and angles of indicated surfaces about a center optical axis A.

FIG. 7 shows one embodiment of a catadioptric lens featuring only the main extruded lens region without coextruded layers. In this and related embodiments, the main extruded lens regions may be surface treated, for example but not limited to, frosting, etching, texturing, and coating, in order to increase the optical dispersion properties of the corresponding treated surface to improve the properties of the inventive catadioptric lens. In related embodiments, either the top or bottom or both surfaces of the main extruded lens region may be surface treated, generally the surface treatment being uniform over the surface and extending across the respective surfaces to the same extent as in alternative embodiments featuring a coextruded layer on the surface of said main extruded lens region.

FIG. 7 shows an inventive embodiment of an extruded lens assembly 700 showing the center of symmetry (SYM) along the perpendicular axis A and some representative size and angle parameters, and typical tolerances related to these parameters as applicable to manufacturing the inventive lenses. In FIG. 7, the overall width W of the lens assembly 700 is shown, the height parameter H being the maximum height of the lens assembly 700 at its greatest cross-dimensional thickness in a direction along the A axis, corresponding to the parallel distance of separation between either or both symmetric points located on the upper apex of both upper lens lobe's upper surfaces, as shown as the point of intersection of upper dimension line H, and the symmetric points located at the lower lob transition plane (see FIG. 1, 111) located at the junction of the lower lens lobe 110 and lower lob transition region 112. Again referring to the labeled sections, regions and edges shown in FIG. 1, the parameter S corresponds to the width of the top dual symmetric left and right upper lens lobes 103, the distance being the span of the two lobes from the left upper lobe transition plane 104 to the corresponding right upper lobe transition plane 104, each of which transition to the corresponding left and right adjacent upper linear transition regions 105. Referring to FIGS. 1 and 7, the parameter V corresponds to the length of the lower lens surface 114 but not including the length of the lower surface of the edge support region 106, this distance V corresponding to the dimension of a lens support channel in a luminaire featuring the inventive catadioptric lens assemblies disclosed herein. The edge thickness parameters, E2, refers to the thickness of the edge support region 106, while the edge tang thickness parameter E2 is equivalent to E1 minus a nominal inset drop parameter, M (not shown, but wherein M=E2−E1), which relates to the lens insert drop distance within a supporting luminaire housing that holds the inventive catadioptric lens assembly in a desired position by means of the edge tang and edge support regions of embodiments of the inventive lens assembly. In this inventive embodiment, the extruded lens assembly 700 has an edge-to-edge width of W, with an upper lobe region width S that defines the combined length of the two upper lobes, which are symmetric and meet at the normal axis A. In one embodiment, the extruded lens assembly 700 is positioned within a luminaire housing by means of suspension using the edge regions to support the inventive lens assembly. Here, the lower lens tang width V is equivalent to a dimension within a supporting luminaire that acts to hold the lens assembly 700 in position by means of suspension of the two edge regions that extend beyond the lower lens tang. Also shown in FIG. 7, E1 is the edge thickness and E2 is the edge tang thickness of the edge regions, also being symmetric across the extended lens assembly 700. In general, the edge regions and ends of the extruded lens assembly 700 are not coextruded or textured, being contiguous with and integral to the extruded main lens region 725.

Figure 8:
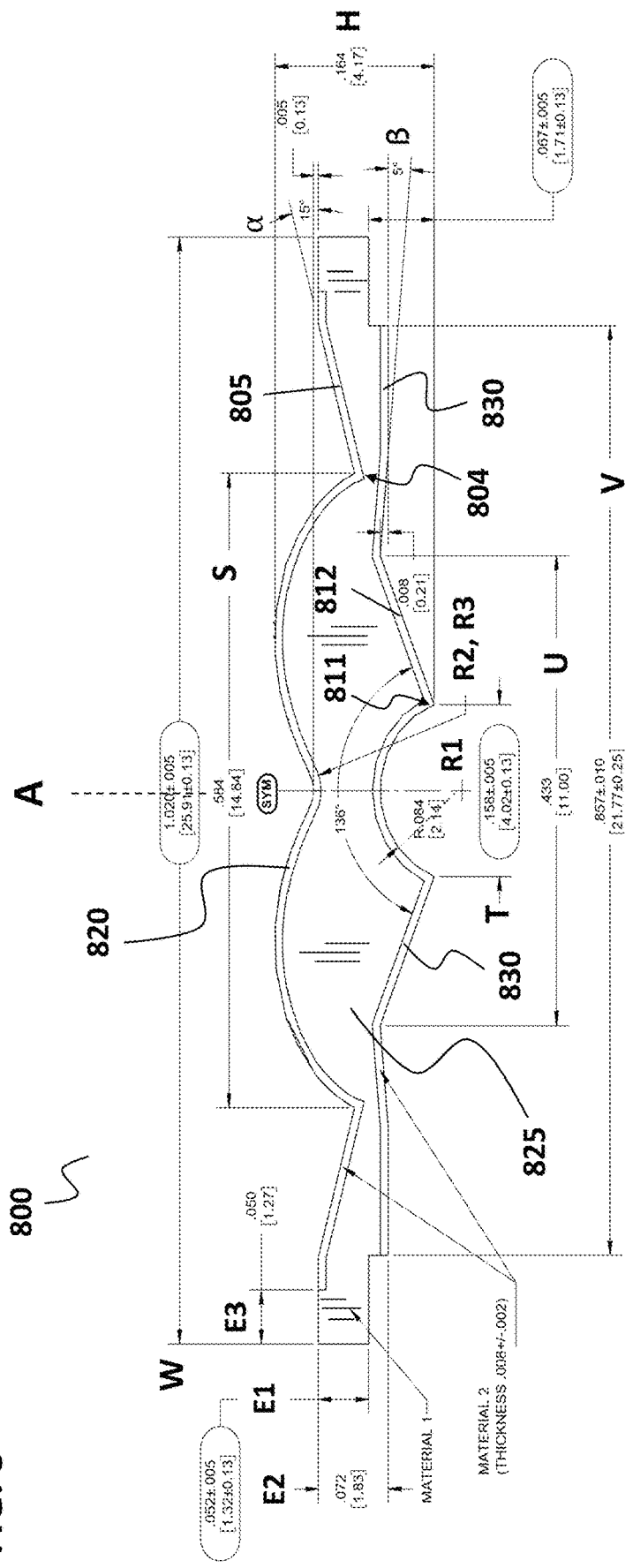
FIG. 8 shows an inventive embodiment of a cross-sectional representation of a coextruded catadioptric lens assembly with example parametric dimensions, tolerances and angles of indicated surfaces about a center optical axis A.

FIG. 8 shows another inventive embodiment of a coextruded lens assembly 800 with both an upper coextruded layer 820 and a lower coextruded layer 830 integrally formed onto the coextruded main lens region 825. In this embodiment, all elements 820, 825 and 830 are bilaterally symmetric about the perpendicular or normal axis A. W is the width of the lens assembly from a left side edge region to a right side edge region both having an edge thickness E1, an edge tang thickness E2 and an upper tang width E3, the edge regions generally being composed only of the same material as the coextruded main lens region and generally free of any surface coating, texturing or treatment. The parameter E3 represents the width of the upper surface portion of the corresponding edge regions from either terminal edge to the start of the corresponding edge of the coextruded upper layer 820, which extends along the top surface of the coextruded main lens region 825 that is contiguous with said end regions. The right and left side edge regions serve as a means to hold or suspend the inventive coextruded lens assembly 800 within a luminaire without obstruction of the extruded main lens region 825 during use. The height or thickness parameter, H, reflects the overall maximum cross-sectional height of the coextruded lens assembly 800. The parameter V represents the maximum width of the lower lens surface from a first left edge region to a second right edge region, and wherein the parameter W is equivalent to V+2*E3. The parameter S corresponds to the width of the top dual symmetric left and right upper lens lobes, the distance being the span of the two lobes from the left upper lobe transition plane to the corresponding right upper lobe transition plane, each of which transition to the corresponding left and right adjacent upper linear transition regions adjacent to the said left and right edge regions, respectively. The various angle parameters defined transition region angles and angles of one or more surfaces with respect to the indicated origin or axis. Here, the angle alpha (α) is the angle made by the top surface of the upper lobe transition plane 804 (see FIG. 1 for reference) of the inventive extruded lens assembly 800, irrespective of whether 800 bears a coextruded upper layer or is contiguous with the extruded main lens region 825, with respect to the horizontal plane as indicated in FIG. 8, the reference horizontal plane being parallel to the projection plane P shown in FIG. 6 and the point of origin being the upper linear transition plane 804, located at the locus of intersection between the plane between the upper lens lobe 803 and the upper lobe transition region 805. This angle α may vary in magnitude as shown in Table I, from a typical value of 15°, including an acceptable range in magnitude of between 5° to 20°. The angle beta (ß) represents the angle shown in FIG. 8, being the angle between the bottom surface of coextruded lens assembly 800 along the surface of the lower lens surface 814 and a second reference horizontal plane being parallel to the projection plane P shown in FIG. 6 and the point of origin being a plane located at the locus of intersection between the lower linear transition region 812 and the lower lens surface 814. The angle ß may vary in magnitude as shown in Table I, from a typical value of 5°, including an acceptable range in magnitude of between 1° to 15°. The angle theta (Ø), as shown in Table I and FIGS. 6 and 7, represents the angle formed by the lowermost surface of embodiments of the inventive lens assembly corresponding to the lower linear transition region 612 with respect to the center of origin C3 of the lower lens lobe 610. As seen in comparison between FIGS. 6 and 7, this angle may (as illustrated in FIG. 7) or may not (as illustrated in FIG. 7) also coincide with the upper lobe transition plane 604 at the intersection of the respective upper lens lobe 603 and upper linear transition region 605, including embodiments wherein the lower lens section 609 features a coextruded bottom layer 630 or not.

Table I shows the various parameters and parametric values for inventive embodiments of the catadioptric lens assembly as shown and described herein. Table I shows the nominal value of each parameter as well as the nominal tolerance found acceptable in actual production and manufacturing process to produce the inventive lens system. Also shown are the normalized values of the parameter, normalized with respect to the larger dimensional factor, W, which corresponds to the maximum width of the inventive lens assembly. Other parameter values are normalized with respect to this dimension for each in proportional scaling of embodiments of the inventive disclosure depending on the ultimate size and dimensions desired. Despite the normalized values shown in Table I, the far right column also shows typical ranges for each of the indicated lens parameters, being acceptable dimensions as appropriate to the application. Variations in some select parameters naturally require modification of another parameter value, so also shown in Table I in terms of generalized limits which restrict a parameter value to the indicated relative dimensional constraint, or which indicate a minimum or maximum value of that parameter, or a minimum, equivalent or maximum value of that parameter as constrained by another parameter.

TABLE I

Catadioptric lens assembly parameters

| Lens Parameter (1) | Nominal Value (2) | Nominal Tolerance (+/−) (3) | Normalized Value (4) | Ranges & Limits (Normalized) (5) |
|---|---|---|---|---|
| H | 4.17 | 0.10 | 16.1 | 10-20 |
| S | 14.84 | 0.13 | 57.3 | 40-70 |
| T | 4.02 | 0.13 | 15.5 | 10-20, T < U, $T_{max} = 2 * R1$ |
| U | 11.0 | 0.43 | 42.5 | 35-55, U < S |

TABLE I-continued

Catadioptric lens assembly parameters

| Lens Parameter (1) | Nominal Value (2) | Nominal Tolerance (+/−) (3) | Normalized Value (4) | Ranges & Limits (Normalized) (5) |
|---|---|---|---|---|
| V | 21.77 | 0.25 | 84.0 | 70-95, V < W |
| W | 25.91 | 0.13 | 100 | W (6) |
| L | 100 | 0.25 | L (7) | L, L > W |
| E1 | 1.32 | 0.05 | 7.06 | 5-9 |
| E2 | 1.83 | 0.05 | 5.10 | 3-7, E2 < E1 |
| E3 | 1.27 | 0.05 | 4.9 | 3-6 |
| M | 0.51 | 0.05 | 1.97 | =E1 − E2 |
| R1(8) | 2.14 | 0.05 | 8.26 | 6-10 |
| R2(8) | 4.13 | 0.05 | 15.9 | 10-20 |
| R3(8) | 4.00 | 0.05 | 15.4 | 10-20, R3 > R1, R3 ≤ R2 |
| α | 15° | 1-2° | 15° | 5-20° |
| β | 5° | 1-2° | 5° | 1-15° |
| θ | 70° | 1-2° | 70° | 50-80° |

(1) As shown in FIGS. 6, 7 & 8
(2) In centimeters (cm)
(3) Maximum acceptable tolerance
(4) Normalized with respect to parameter W for proportional scaling
(5) Range of parameter values, with respect to normalized parameter W
(6) Width is any desired value, generally W ≥ 5 cm to about 100 cm.
(7) Length is any desired value, generally L ≥ W for a single LED luminaire
(8) Generally R2 ≥ R3 and R2, R3 > R1

Figure 9:
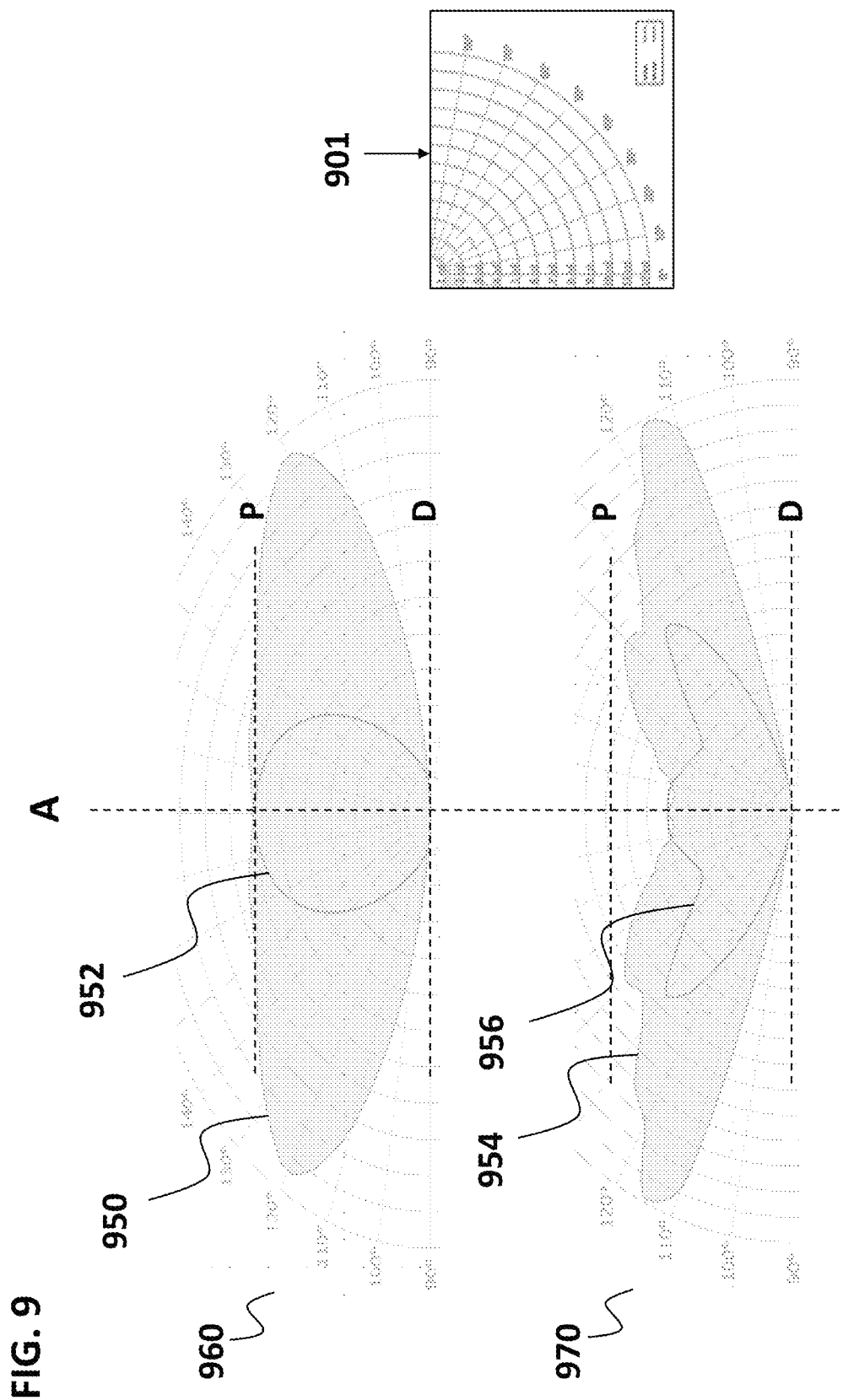
FIG. 9 shows polar radiance plots of two embodiments of the inventive catadioptric lens assembly when a source of incoming or incident irradiation is supplied along the optical axis A.

FIG. 9 shows the polar radiance plots of two embodiments of the inventive catadioptric lens assembly when a source of incoming or incident irradiation is supplied, positioned above the lens assembly and oriented along the perpendicular or normal axis A, with respect to the horizontal plane D, coinciding with a plane of incident light originating from the point source at a position corresponding to the intersection of axis A and plane D, as directed onto an illumination plane, P.

In FIG. 9, the inset key 901 shows the relative radiative intensity with corresponding circular grid lines corresponding to candelas (units of cd), wherein a candela is the base unit of luminous intensity in the International System of Units (SI) corresponding to the luminous power per unit solid angle emitted by a point light source in a particular direction, each successive circular grid corresponding to a candela unit of 1.0 in luminosity at the angle shown. Luminous intensity is analogous to radiant intensity, but instead of simply adding up the contributions of every wavelength of light in the source's spectrum, the contribution of each wavelength is weighted by the standard luminosity function, a model of the sensitivity of the human eye to different wavelengths, a reference frequency chosen to be in the visible spectrum near green, corresponding to a wavelength of about 555 nanometers where the human visual perception of color is heightened under daylight conditions or typical levels of illumination found within a home, building, office space or industrial environment requiring adequate lighting.

The angular grid lines in FIG. 9 correspond to the angular direction of the outgoing or emitted irradiation with respect to the normal axis A, measured in radial units of degrees (°).

In FIG. 9, the lower luminosity plot 970 shows the luminosity of one embodiment of the inventive lens assembly featuring only an extruded main lens region without any surface texturing or modification or a coextruded main lens assembly with either or both of a coextruded upper or lower layer being optically clear, representing a "clear" lens configuration. Plot 970 features the total illumination zone 954 and a central illumination zone 956, representing approximately an envelope corresponding to a collective 50% of the total luminosity of zone 954. The central illumination zone 945 is somewhat irregularly shaped and the projected luminosity on the projection plane P would correspondingly not be as uniform as the upper luminosity plot 960, which is a more preferred embodiment.

Plot 960 shows the luminosity envelop of a second embodiment of an inventive lens assembly featuring a coextruded lower lens layer having a medium surface texture providing a medium level of diffusion. In this latter embodiment, the total illumination zone 950 is more uniform across the plot and covers a larger area of luminosity than the first embodiment 960. In addition, the medium diffusing second embodiment produces a very uniform and nearly circular central illumination zone 952 within the illumination zone 950, both of which extend to the desired projected illumination plane P, resulting in a more uniform illumination pattern on plane P with medium diffusivity being provided. A nearly identical effect is produced by applying a surface texturing to produce a similar extent of diffusion to a lower surface of a single extruded main lens region. Further, a nearly identical effect is produced by applying a surface texturing to produce a similar extent of diffusion to an upper surface of a single extruded main lens region, or wherein a textured, patterned or frosted coextruded top layer is present. In other embodiments, a desired uniform and nearly circular central illumination zone is produced provided that either a coextruded top layer or bottom layer is present that has differing optical properties, including but not limited to, opacity, optical density, surface texturing, frosting, hazing or patterning, than the underlying coextruded main lens region. In yet further related embodiments, a desired uniform and nearly circular central illumination zone is produced provided that either an upper (top) or lower (bottom) surface of a single main lens region is treated to produce one or more differing optical properties, including but not limited to, opacity, optical density, surface texturing, frosting, hazing or patterning, than the underlying extruded main lens region, including one or more coatings, films or layers thereon.

Although not shown here, a slight deviation of from 1° to about 15° of the incident angle of incoming irradiation with respect to the perpendicular or normal axis A, results in a fully acceptable central illumination zone, the inventive catadioptric lens assemblies disclosed herein being very robust in the production of a uniform plane of illumination even with some misalignment between the incident light source (a point or linear array of point light sources) and the inventive lens assembly when positioned within a supporting luminaire.

In addition, the distance of separation between the incident light source and the top of the inventive lens assembly can vary as well while producing an acceptable uniform central illumination zone, which tends to expand in size with increasing distance between the light source and the lens assembly. These features of the disclosed embodiments of the inventive catadioptric lens assembly provide for ease in the assembly and orientation of the component parts of a luminaire using the inventive lens assembly, as slight misalignments and the distance of separation can be varied without significantly impacting the overall performance of the assembly in producing a uniform illumination zone.

Figure 10:
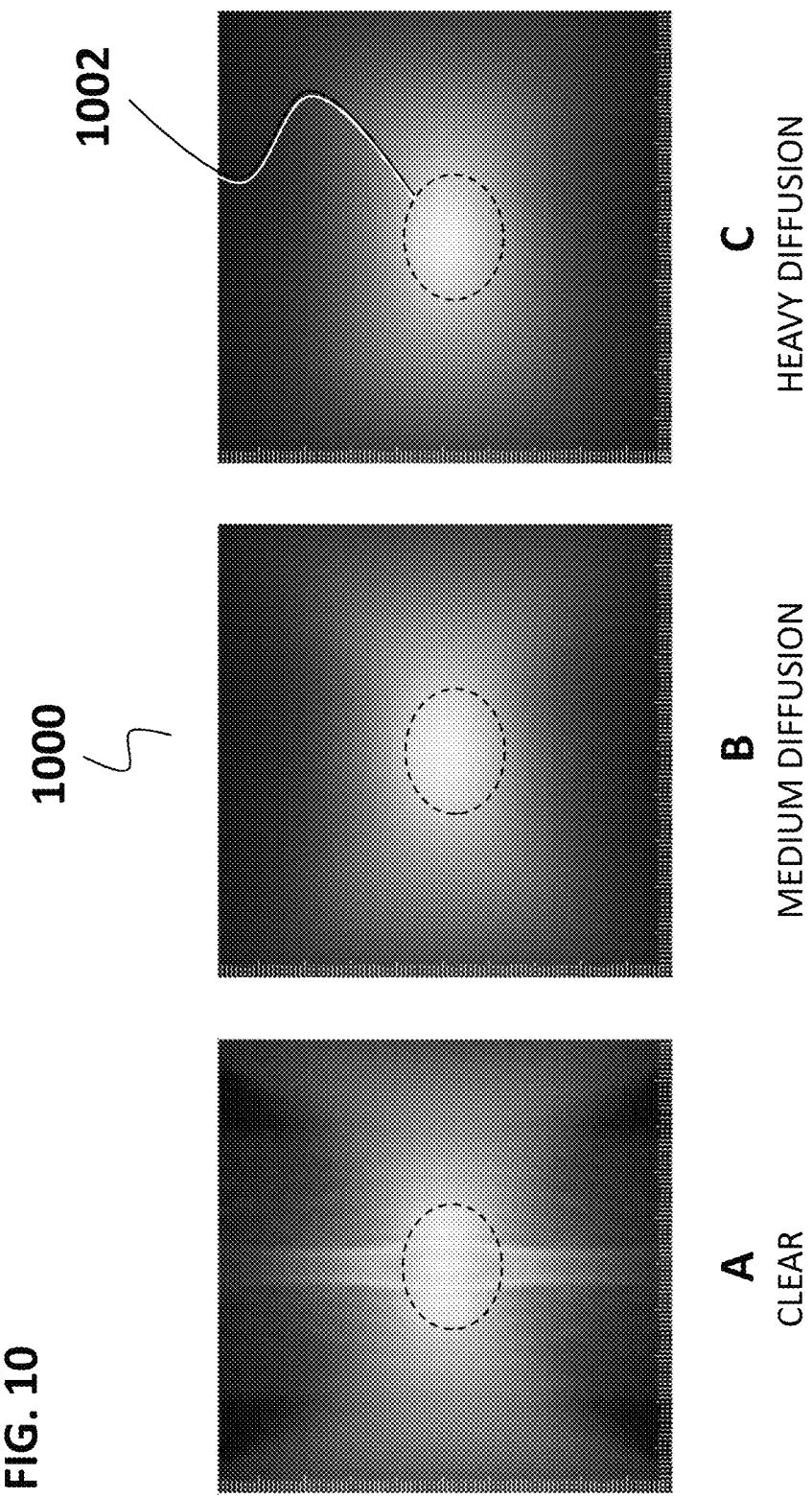
FIG. 10 shows luminosity plots of several embodiments of the inventive catadioptric lens assembly with a single pixel or point light source providing incident radiation, the lens assembly having differing degrees of diffusion.

FIG. 10 shows luminosity plots 1000 representative of a single pixel or point light source providing incident radiation to three embodiments of the inventive lens assembly, a first lens assembly A that is optically clear, a second lens assembly B featuring a single coextruded layer having a medium diffusivity, and a third lens assembly C featuring a single coextruded layer having a heavy diffusivity. As can be seen in FIG. 10, the central illumination zone 1002 becomes more uniform and regular as the extent of diffusivity is increased from clear to heavy diffusion. Similar results are seen when example embodiment C is replaced by an inventive embodiment featuring two coextruded layers each having only a light or medium diffusivity. In a linear array of multiple, evenly spaced light sources, such as a linear LED light source, the individual pixel illumination zones shown in FIG. 10 overlap sufficiently with typical inter LED spacing so as to product a uniform, linear illumination zone symmetric about and extending along the B longitudinal axis or length of the inventive catadioptric lens assembly according to the present disclosure and embodiments described herein.

Process & Materials

Any suitable materials can be used and employed to construct and fabricate the inventive lens assemblies described herein. Any material capable of suitable light transmission or refraction is suitable, including for example, but not limited crystalline and fused materials, glass, polymers, resins and combinations thereof. One non-binding example is polymethylmethacrylate (PMMA) recognized in the art as an inexpensive but optically suitable material that can be produced with high quality and having excellent optical properties well suited for lighting applications. Other polymers known in the art are also suitable, including meltable (fusion) polymers and resins suitable for injection processing as well as thermoset polymers capable of being molded in place or molded with heat or radiation to complete cross-linking and setting. Being linearly contiguous, an extrusion process is a convenient process to fabricate the inventive lens assemblies disclosed herein, included the main extruded lens segment as well as coextruded portions or layers that can be formed contiguously during the extrusion process by using multiple injection nozzles shaped and positioned accordingly to form the portions of the inventive lens assembly as disclosed hereinabove. Other processes to produce the inventive lens assemblies that are known in the art, including but not limited to, casting, layering, lamination, molding, 3-D printing and sintering of suitable optical materials are also acceptable for use in the manufacture of the catadioptric lenses disclosed herein.

The lens materials may include multiple materials that have different optical properties, but which may be combined together seamlessly or with an optical cement or adhesive to form the compound contiguous lens assemblies shown and described herein. The lens materials may be different materials, for example, different polymers or a combination of a center lens of a first material and second upper or lower layers of a second or third material, respectively.

The various lens materials employed can be the same material, but have the same or different refractive indexes and other optical properties. In some embodiments, the mains lens portion or region is formed from an acrylic resin or PMMA, but the upper and lower layers are applied as a skim coat to simulate a texture finish on an injection molded process. In a related embodiment, the upper and lower surfaces of a single extruded main lens region is surface treated to effect such a modified optical layer on the selected surface by means disclosed herein.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

The invention claimed is:

1. A catadioptric lens assembly comprising:
(a) a lens configured to receive light from a light source;
wherein said lens has an upper lens section and a lower lens section disposed opposite the upper lens section;
wherein said upper and lower lens sections encompass a intermediate mains lens region;
wherein the light from said light source is directed onto said upper lens section and is subsequently emitted from said lower lens section;
wherein the upper lens section features a first and second bilaterally symmetric upper lens lobe each with surfaces exhibiting positive curvatures situated about a center optical axis A that is normal and perpendicular with respect to a cross-sectional plane through the upper lens section;
wherein said lower lens section features a single symmetric lower lens lobe with a surface exhibiting negative curvature situated about said center optical axis A;
wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively;
wherein said lower lens lobe is contiguous and adjacent to right and left lower linear transition regions;
wherein said right and left lower transitions regions are contiguous and adjacent to said right and left edge support regions, respectively; and
(b) a light source; wherein said light source is selected from a point source, a linear source, and a linear array of point sources.

2. The catadioptric lens assembly of claim 1, wherein at least a portion of either said upper or lower surfaces of said upper and lower lens sections is composed of materials having different optical properties from said main lens region.

3. The catadioptric lens assembly of claim 2, wherein said upper lens section comprises an upper coextruded top layer adjacent to and contiguous with said upper lens section and extending from a first left edge support region to a second right edge support region.

4. The catadioptric lens assembly of claim 2, wherein said lower lens section comprises a lower coextruded bottom layer adjacent to and contiguous with said lower lens section and extending from a first left edge support region to a second right edge support region.

5. The catadioptric lens assembly of claim 2, wherein said upper lens section comprises an upper coextruded top layer adjacent to and contiguous with said upper lens section and extending from a first left edge support region to a second right edge support region; and
wherein said lower lens section comprises a lower coextruded bottom layer adjacent to and contiguous with said lower lens section and extending from a first left edge support region to a second right edge support region.

6. The catadioptric lens assembly of claim 2, wherein said portion of either of said upper or lower surfaces of said upper and lower lens sections comprises a contiguous film of uniform thickness of a material having different optical properties from said main lens region.

7. The catadioptric lens assembly of claim 2, wherein said portion of either said upper and lower surfaces of said upper and lower lens sections is composed of materials that exhibit light scattering properties; and wherein said main lens is composed of an optically clear material.

8. The catadioptric lens assembly of claim 1, wherein said upper lens lobes have upper surfaces exhibiting a surface curvature corresponding to a segment selected from a circle, ellipse and parabola; and wherein said lower lens lobe has a lower surface exhibiting a surface curvature corresponding to a segment of a circle.

9. The catadioptric lens assembly of claim 8, wherein said upper lens lobes with upper surfaces exhibiting a convex surface curvature corresponding to a segment of a circle have centers of origin C2 and C3 located on a horizontal plane parallel to a plane bisecting said upper and lower lens sections, and have a radius of R2.

10. The catadioptric lens assembly of claim 8, wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3.

11. The catadioptric lens assembly of claim 8, wherein said upper lens lobes with upper surfaces exhibiting a convex surface curvature corresponding to a segment of a parabola have centers of origin C2 and C3 located on a horizontal plane parallel to a plane bisecting said upper and lower lens sections, and have a radius of R2 and a parabolic constant of n.

12. The catadioptric lens assembly of claim 8, wherein said lower lens lobe with a lower surface exhibiting a concave surface curvature corresponding to a segment of a circle has a center of origin C1 located on a normal perpendicular axis A, and having a radius of R1.

13. The catadioptric lens assembly of claim 8, wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3; and
wherein said lower lens lobe with a lower surface exhibiting a concave surface curvature corresponding to a segment of a circle has a center of origin C1 located on a perpendicular optical axis A, and having a radius of R1.

14. The catadioptric lens assembly of claim 13, wherein said second and third centers of origin C2 and C3 are located on a horizontal plane bisecting said upper lens section and said lower lens section; with a first center of origin located on said perpendicular optical axis A;
wherein said first, second and third centers of origin C1, C2 and C3 are positioned in a triangular relationship; wherein C1, C2 and C3 are located on the vertices of a hypothetical equilateral triangle wherein C1 is located on said perpendicular optical axis A; wherein C1 is located below said horizontal plane; and
wherein C2 and C3 are located on a horizontal plane parallel to a plane bisecting said upper and lower lens sections.

15. A luminaire, comprising:
(a) at least one light source;
(b) a catadioptric lens assembly configured to receive light from at least one solid state light source;
wherein said lens assembly has an upper lens section, an intermediate main lens region and a lower lens section disposed opposite the upper lens section; wherein the light from said light source is directed onto said upper lens section and is subsequently emitted from said lower lens section; wherein the upper lens section comprises a first and second bilaterally symmetric upper lens lobe each with surfaces exhibiting positive curvatures situated about a center optical axis A that is normal and perpendicular with respect to a cross-sectional plane through the upper lens section; wherein said lower lens section features a single symmetric lower lens lobe with a surface exhibiting negative curvature situated about said center optical axis A; wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively; wherein said lower lens lobe is contiguous and adjacent to right and left lower linear transition regions; wherein said right and left lower transitions regions are contiguous and adjacent to said right and left edge support regions, respectively; and
(c) a housing supporting said light source and said catadioptric lens assembly.

16. The luminaire of claim 15, wherein said light source is a solid state light source selected from an LED, LED array, Lambertian emitter, $2\pi$ emitter, and fiber optic light guide.

17. The luminaire of claim 15, wherein said light source is a linear light source selected from an incandescent lamp, fluorescent tube, linear LED, linear LED array, linear Lambertian emitter, and linear fiber optic light guide.

18. The luminaire of claim 15, wherein at least a portion of either said upper or lower surfaces of said upper and lower lens sections is composed of materials having different optical properties from a main lens region located between said upper and lower lens surfaces;
wherein said upper lens section comprises an upper coextruded top layer adjacent to and contiguous with said upper lens section and extending from a first left edge support region to a second right edge support region; and
wherein said lower lens section comprises a lower coextruded bottom layer adjacent to and contiguous with said lower lens section and extending from a first left edge support region to a second right edge support region.

19. The luminaire of claim 15, wherein at least a portion of either said upper or lower surfaces of said upper and lower lens sections is composed of materials having different optical properties from a main lens region located between said upper and lower lens surfaces; and
wherein said portion of either of said upper or lower surfaces of said upper and lower lens sections comprises a contiguous film of uniform thickness of a material having different optical properties from said main lens region.

* * * * *